(12) United States Patent
Ishizuka et al.

(10) Patent No.: US 7,903,881 B2
(45) Date of Patent: Mar. 8, 2011

(54) IMAGE PROCESSING DEVICE

(75) Inventors: Ryuichi Ishizuka, Ebina (JP); Mari Kodama, Ebina (JP); Yasushi Nishide, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 86 days.

(21) Appl. No.: 12/285,614

(22) Filed: Oct. 9, 2008

(65) Prior Publication Data

US 2009/0052782 A1 Feb. 26, 2009

Related U.S. Application Data

(62) Division of application No. 11/647,256, filed on Dec. 29, 2006, now Pat. No. 7,480,413, which is a division of application No. 10/175,450, filed on Jun. 20, 2002, now Pat. No. 7,200,268.

(30) Foreign Application Priority Data

Jun. 20, 2001 (JP) ................................ 2001-187236

(51) Int. Cl.
*G06K 9/46* (2006.01)
(52) U.S. Cl. ......... 382/202; 382/177; 382/266; 382/292; 715/211; 715/247
(58) Field of Classification Search .................. 358/518; 382/165, 167, 199, 203, 252, 255, 283, 316
See application file for complete search history.

(56) References Cited

U.S. PATENT DOCUMENTS

| | | | |
|---|---|---|---|
| 4,998,211 A | | 3/1991 | Hamada et al. |
| 5,091,967 A | | 2/1992 | Ohsawa |
| 5,293,471 A | * | 3/1994 | Ikeuchi et al. ................ 345/443 |
| 5,300,927 A | * | 4/1994 | Arai et al. ...................... 345/157 |
| 5,333,213 A | * | 7/1994 | Koyama et al. ............... 382/283 |
| 5,351,137 A | * | 9/1994 | Kato et al. ..................... 382/252 |
| 5,412,742 A | * | 5/1995 | Takasaki et al. .............. 382/316 |
| 5,448,692 A | | 9/1995 | Ohta |
| 5,850,254 A | | 12/1998 | Takano et al. |
| 5,949,906 A | * | 9/1999 | Hontani et al. ................ 382/177 |

(Continued)

FOREIGN PATENT DOCUMENTS

JP A-06-231238 8/1994

(Continued)

OTHER PUBLICATIONS

Nov. 8, 2010 Office Action issued in U.S. Appl. No. 12/285,613.

*Primary Examiner* — Gregory M Desire
(74) *Attorney, Agent, or Firm* — Oliff & Berridge, PLC

(57) ABSTRACT

An image processing device is structured such that an appropriate judgement of an image, at which blurring or disappearance or the like will occur, is possible. When pixels, which form a line image at which there is the possibility that blurring or disappearance will occur at the time of printing by using a printing plate, are extracted, a line image warning function gives notice by displaying a warning message on a monitor of a client terminal. Thereafter, image converting and print setting are carried out such that an extracted line image is clarified. In this way, when a proof is prepared, an image, at which there is the possibility that blurring or disappearance will occur on a printed matter obtained by using a printing plate, is clarified, and appropriate proofing is possible.

7 Claims, 10 Drawing Sheets

U.S. PATENT DOCUMENTS

| | | | |
|---|---|---|---|
| 6,067,377 A * | 5/2000 | Hata | 382/167 |
| 6,084,984 A | 7/2000 | Ishikawa | |
| 6,118,897 A | 9/2000 | Kohno | |
| 6,201,894 B1 | 3/2001 | Saito | |
| 6,252,985 B1 | 6/2001 | Mitsunaga et al. | |
| 6,330,360 B1 | 12/2001 | Saito | |
| 6,356,648 B1 * | 3/2002 | Taguchi | 382/111 |
| 6,434,270 B1 | 8/2002 | Ohara et al. | |
| 6,466,954 B1 * | 10/2002 | Kurosawa et al. | 715/209 |
| 6,654,495 B1 | 11/2003 | Katoh et al. | |
| 6,744,921 B1 | 6/2004 | Uchida et al. | |
| 6,769,103 B2 * | 7/2004 | Chevallier et al. | 716/5 |
| 6,798,906 B1 | 9/2004 | Kato | |
| 6,813,381 B2 | 11/2004 | Ohnishi et al. | |
| 6,928,188 B2 | 8/2005 | Katsuyama | |
| 6,983,077 B2 * | 1/2006 | Yamazaki | 382/266 |
| 7,079,270 B2 | 7/2006 | Kiyosu et al. | |
| 2002/0021840 A1 | 2/2002 | Ohara et al. | |
| 2002/0094122 A1 * | 7/2002 | Matsukubo et al. | 382/165 |
| 2002/0196455 A1 | 12/2002 | Ishizuka et al. | |

FOREIGN PATENT DOCUMENTS

| | | |
|---|---|---|
| JP | A-10-171801 | 6/1998 |
| JP | A-2000-343764 | 12/2000 |

\* cited by examiner

FIG.3A

SETTING OF DETAILS

| COLOR | PAPER/DISCHARGE PROCESSING | OUTPUT DESIGNATION | IMAGE QUALITY | HAIR LINE WARNING | USER INFORMATION |

☑ HAIR LINE WARNING

TYPE OF WARNING: [ ERASING ▼ ]

- ERASING
- WARNING COLOR
- ERASING
- EXTRACTING
- ERASING+EXTRACTING(WHEN APPROPRIATE)
- WARNING COLOR(INFORMATION DISPLAY)

WARNING THRESHOLD VALUE

WARNING COLOR: C [ 0 ] M [ 100 ] Y [ 0 ] K [ 0 ]

LINE WIDTH [ 9 ] pt

[ SET ]   [ CANCEL ]

FIG.3B

SETTING OF DETAILS

| COLOR | PAPER/DISCHARGE PROCESSING | OUTPUT DESIGNATION | IMAGE QUALITY | HAIR LINE WARNING | USER INFORMATION |

☑ HAIR LINE WARNING

TYPE OF WARNING    WARNING COLOR ▼

WARNING THRESHOLD VALUE    0.09 pt

WARNING COLOR

C 0    M 100    Y 0    K 0

LINE WIDTH 9 pt

SET    CANCEL

IMAGE PROCESSING DEVICE

This is a Divisional of application Ser. No. 11/647,256, filed Dec. 29, 2006, which in turn is a Divisional of application Ser. No. 10/175,450, filed Jun. 20, 2002. This application claims the benefit of Japanese Patent Application No. 2001-187236, filed Jul. 25, 2002. The disclosures of the prior applications are incorporated by reference herein in their entirety.

BACKGROUND

The present invention relates to an image processing device carrying out image processing corresponding to image data or a drawing command, generated by various types of applications.

Digitization has spread to the field of printing processing, and the trend toward DTP (Desktop Publishing) has advanced. In this way, a page layout is generated by making, treatment (trimming), editing, and the like of an image in a processing device such as a personal computer, a work station, or the like. A film is prepared on the basis of this page layout, or a printing plate for printing is prepared by directly writing onto a printing plate (CTP: Computer to Plate).

On the other hand, when proofing is carried out in advance of printing or the like which uses an actual printing plate, a page layout is displayed on a monitor by using the WYSIWYG function, or is printed out by a printout device such as a laser printer, a page printer, or the like.

In printing using a printing plate, a thinner line can be specified (represented) than in printing using a printer. Namely, resolution of 2400 dpi or more can be obtained in printing using a printing plate, whereas the resolution is about 400 dpi to 600 dpi in printing using a printer.

Accordingly, even in the case of a thin line which can be specified in printing using a printing plate, there are cases in which the thin line disappears or becomes blurred on a printed matter (a printing sheet) by using a printer.

Therefore, in Japanese Patent Application Laid-Open (JP-A) No. 6-231238, a thin line is converted to a line having a thickness which can be outputted by a printer, and occurrences of disappearance, blurring, and the like of the thin line are thereby prevented at the time of printing by using a printer.

However, a printed matter, which is prepared by carrying out printing processing by converting a thin line which cannot be represented by a printer to a thin line which can be represented by the printer, is different from a printed matter prepared by using a printing plate. For example, even in the case of a line image of a thickness by which blurring and the like occur when a printing plate is used, the line image is represented as a line image in which blurring does not occur, on a printed matter prepared by using a printer.

Further, in a case in which a thin line which cannot be outputted by a printer is merely converted to a thickness which can be outputted by the printer, there are cases in which even thin line images, at which blurring or the like occurs at the time of printing by using a printing plate, are outputted. Therefore, because it cannot be verified how the image will appear in the printed matter, accurate proofing is of course difficult, and what portions are different is unclear until a printing plate is prepared and printing processing is actually carried out.

SUMMARY

The present invention has been achieved in consideration of the above-described facts, and an object thereof is to provide an image processing device in which it is clear that a line image is a line image at which blurring or the like occurs when printing is carried out by using a printing plate when, for example, image processing or the like is carried out on the basis of a drawing command or image data generated by an image processing terminal such as a work station, a personal computer, or the like.

In order to achieve the above-described object, the present invention provides an image processing device which carries out image processing on the basis of at least one of a drawing command and image data generated at an image processing terminal, the image processing device comprising: an extracting section for extracting a predetermined line image from the at least one of the image data and the drawing command; and a processing section for effecting predetermined processing such that the line image extracted by the extracting section can be recognized as the predetermined line image.

In accordance with the invention, the predetermined processing, for example, image conversion is carried out such that it is clarified that the line image extracted by the extracting section is the predetermined line image. In this way, for example, by carrying out image conversion such that it is clarified that the line image is a line image at which blurring will occur at the time of printing by using a printing plate, when printing processing is carried out by using a lower-resolution printer, it can be clarified that the image is an image at which there is the possibility that blurring or disappearance will occur on a printed matter obtained by using the printing plate.

Also, the present invention provides an image processing device which carries out image processing on the basis of at least one of a drawing command and image data generated at an image processing terminal, the image processing device comprising: an extracting section for extracting a predetermined line image from the at least one of the image data and the drawing command; an image converting section for converting the line image extracted by the extracting section into a predetermined image; and a warning section for warning that image conversion is carried out by the image converting section on the line image extracted by the extracting section.

In accordance with the invention, when, on the basis of the image data or the drawing command, the extracting section extracts the predetermined line image set in advance, warning is carried out by the warning section. In this way, for example, when an image, at which blurring or disappearance will occur on a printed matter prepared by using a printing plate, is extracted, warning can be carried out by giving notice of extraction of such the line image, or the like.

Accordingly, even if proof printing is carried out by using a printout device such as a printer whose resolution is lower than a printed matter prepared by using a printing plate, appropriate proofing is possible.

In this invention, the warning section may give notice, by display on an image processing terminal, that the predetermined line image has been extracted by the extracting section, or may carry out image conversion such that the extracted image is clarified, or may carry out these together. Namely, the warning section may set the image conversion.

As such image conversion, the processing section (the image converting section) may convert the line image extracted by the extracting section into a line image having a thickness greater than or equal to a predetermined thickness, or may convert a color of the line image extracted by the extracting section into a predetermined color, or may carry out these conversions together.

Moreover, the processing section (the image converting section) may erase the line image extracted by the extracting section, or may generates image data of only the line image extracted by the extracting section.

Moreover, any of these converting methods may be designated from an image processing terminal.

On the other hand, the extracting section may extract the line image from raster data generated on the basis of the image data, or may extract the line image from the descriptions of a drawing command. Further, when the line image is extracted from raster data, pixels in a predetermined region and patterns set in advance may be compared. Moreover, the invention is not limited to the same, and a conventionally known and arbitrary image extracting method can be used.

BRIEF DESCRIPTION OF THE DRAWINGS

FIGS. 3A and 3B are schematic diagrams showing one example of dialogs carrying out settings of a thin line warning function, wherein FIG. 3A shows settings by a pull-down menu, and FIG. 3B shows one example of the settings.

DETAILED DESCRIPTION OF EMBODIMENTS

Figure 1:
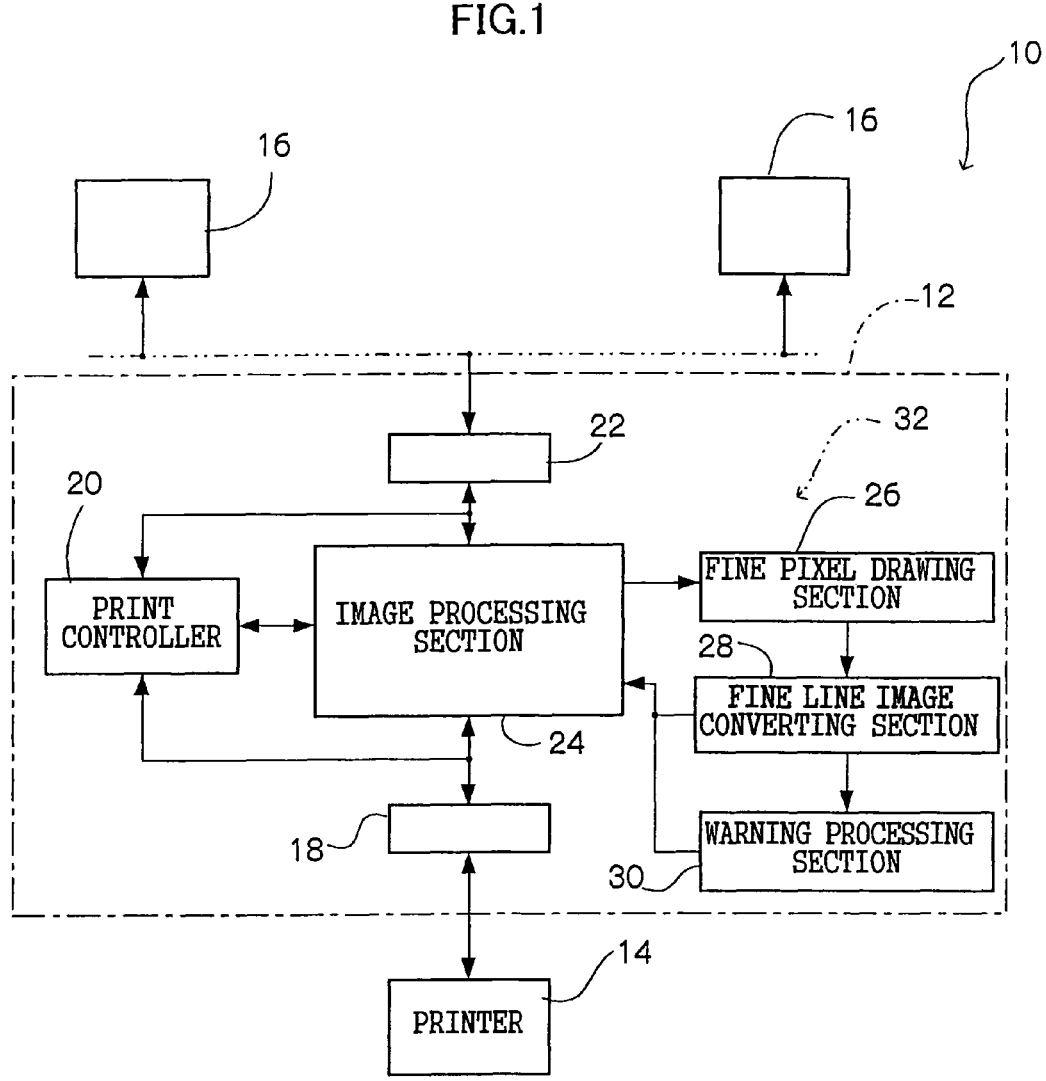
FIG. 1 is a schematic block diagram of a printing system applied to the present embodiment.

Hereinafter, embodiments of the present invention will be described. In FIG. 1, a schematic structure of a printing system 10 applied to the present embodiment is shown. The printing system 10 has an image processing device 32 structured by adding a PCI board having predetermined functions to, for example, a personal computer (PC) having a general structure. Further, a printer 14 is connected as a printout device to the image processing device 32, and can print out an image processed at the image processing device 32.

Further, a personal computer, a work station, and the like are connected as client terminals 16 to the image processing device 32. The client terminals 16 are used for DTP which carries out image processing, such as making, treatment, editing, and the like of an image, by using various types of applications. The image processing device 32 carries out image processing for carrying out printing processing on the basis of drawing commands from these client terminals 16.

Namely, in the printing system 10, the image processing device 32 is structured in a print server 12. Note that the print server 12 may have a structure in which a plurality of printers 14 are connected to a print controller 20 via a two way interface 18 such as an Ethernet or the like, or the plurality of client terminals 16 are networked via a network interface 22, as a LAN, a WAN, or the like.

A ROM, a RAM, an external memory such as a HD is provided at the print server 12. The print server 12 operates in accordance with a operating program stored in the ROM, and executes processings for system graphics, images, characters, tables, or the like, on the basis of programs stored in the ROM or the external memory. Further, the print server 12 is provided with input devices such as a keyboard, a mouse (neither are illustrated), or the like, and a display device such as a CRT display or the like. Further, in the print server 12 as well, printing processing of an image displayed on the display device is possible (WYSIWYG function).

An image processing section 24 is provided in the image processing device 32. The image processing section 24 generates raster data from image data on the basis of a drawing command. Due to the raster data being controlled by the print controller 20 and being outputted to the printer 14, a printed matter based on the image data can be obtained.

On the other hand, by using various types of DTP applications such as, for example, PhotoShop, Illustrator (both trade names of products of Adobe Systems Incorporated), QuarkXPress (the trade name of a product of Quark, Inc.), or the like, the client terminal 16 carries out image processings such as image making, treatment, editing, and the like. At this time, these applications generate a page layout in PostScript format or the like.

In the present embodiment, the page layout generated by the client terminal 16 is used in preparing of a film used in exposing a printing plate by a color electronic plate making system (CEPS), or is used in exposing a printing plate in direct plate making (CTP). Printing processing is carried out by a printing plate prepared on the basis of this page layout.

In a color electronic plate making system or a direct plate making system, before preparing of a printing plate based on the page layout generated by the client terminal 16, proof printing, which prepares a printed matter for proofing, called a color proof or the like (and a "proof" hereinafter), is carried out.

When carrying out this proof printing, the drawing commands and the image file including the page layout, from the client terminal 16, are outputted to the printer server 12 as a print job. In this way, the print server 12 carries out printing processing on the basis of the page layout.

The page layout inputted from the client terminal 16 may be in YMCK format, or may be in RBG format, or may be such that both of these formats are used. In the image processing section 24, raster data of the respective colors of Y, M, C, K are generated from the page layout on the basis of the drawing commands, and are outputted to the printer 14.

A thin line warning function, which is called, for example, a hair line warning function, is provided as one of the printing functions in the image processing device 32. The thin line warning function is structured by a fine line image extracting section 26, a fine line image converting section 28, and a warning processing section 30.

The fine line image extracting section 26 extracts pixels forming a predetermined thin line image from the drawing command or the raster data generated at the image processing section 24. The fine line image extracting section 26 applied to the present embodiment extracts a thin line by which there is the possibility that blurring or disappearance will occur on the printed matter printed by using a printing plate, for example, of course when the proof is printed out by the printer 14. Note that the line image extracted in the present embodiment may be a straight line or a circular arc, or may be a curve of any of various shapes.

Further, the fine line image converting section 28 carries out a predetermined processing on an image formed by the pixels extracted by the fine line image extracting section 26. Moreover, the warning processing section 30 carries out warning processing so as to clarify that a fine line image (a thin line image) has been extracted at the fine line image extracting section 26. In this way, it is clarified that a proof image, formed on the proof, outputted by the printer 14 is different from the original page layout.

Here, one example of processing on thin lines or the like in the image processing device 32 will be described with reference to the figures. Note that, hereinafter, an example is described in which a line image of a predetermined thickness or less is extracted from the raster data generated at the image processing section 24 on the basis of the image data and drawing commands. However, extraction of thin lines in the invention is not limited to this, and thin line extraction may be carried out from descriptions of, for example, the drawing commands or the like.

Figure 2:
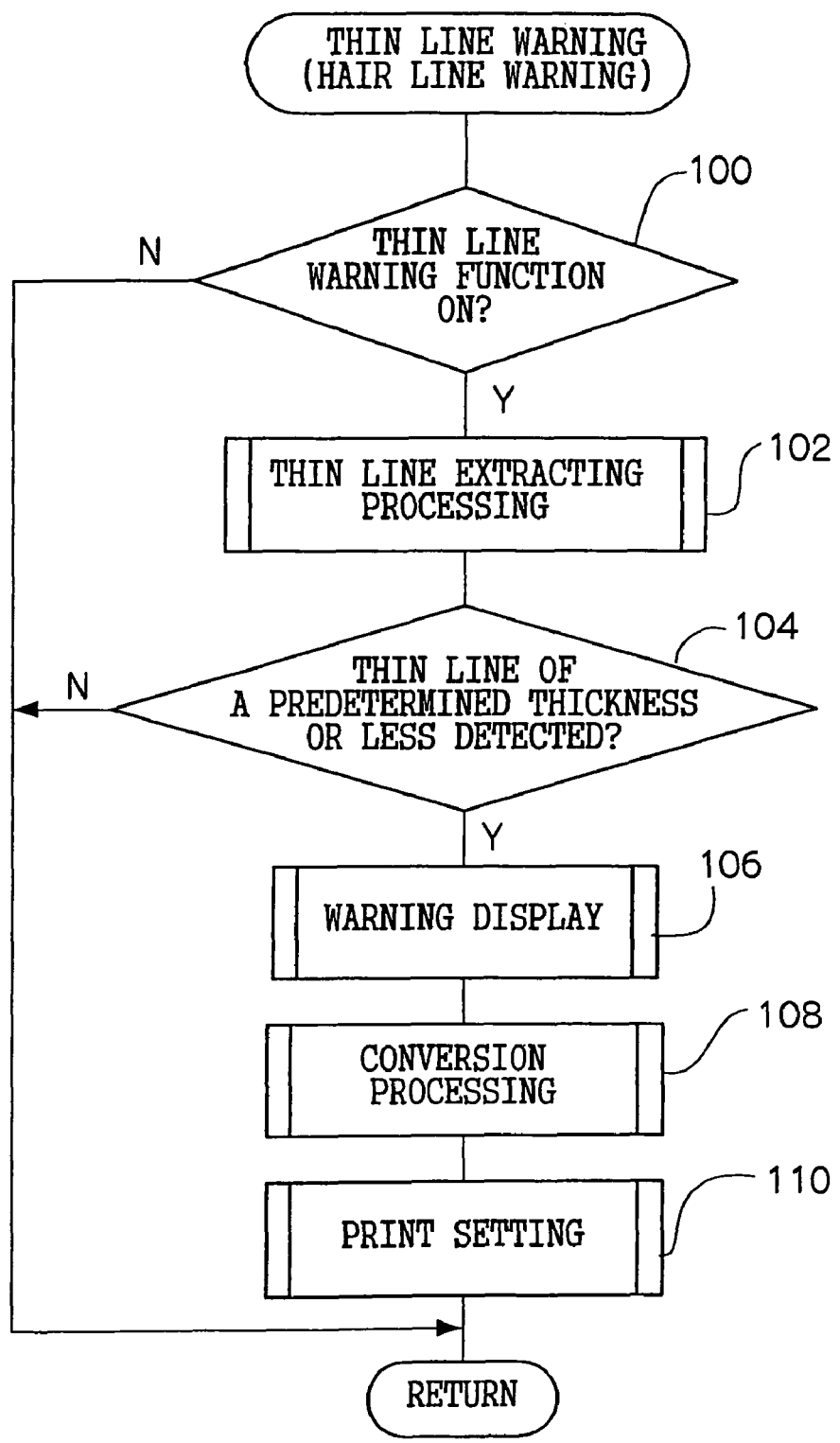
FIG. 2 is a flowchart showing the basics of image processing with respect to a line image in the present invention.

In FIG. 2, a flow of the basic processing of thin line warning is shown. In this flowchart, in the first step 100, it is verified whether the thin line warning function is set or not. If the thin line warning function is set (affirmative judgement in step 100), the routine proceeds to step 102, and extracting of pixels forming a thin line image from the generated raster data is carried out. Further, in step 104, it is verified whether or not pixels forming a thin line of a predetermined thickness or less have been extracted.

Here, when a thin line (pixels forming the thin line) of a predetermined thickness or less has been extracted, the judgement in step 104 is affirmative, and the routine proceeds to step 106. Note that, when there is no thin line of a predetermined thickness or less, the judgement in step 104 is negative, and the thin line warning processing is finished.

In step 106, it is notified that a thin line of a predetermined thickness or less has been extracted. This notification displays a warning message warning of the existence of a thin line at which there is the possibility that blurring or the like may occur, on an unillustrated monitor of the client terminal 16 which requested the print job.

In the next step 108, processing on the line image formed by the extracted pixels is carried out. As this processing, for example, the corresponding image on a printed matter outputted from the printer 14 is erased, or the thin line is converted into a thick line or a color of the thin line is converted so as to have a different color, such that the corresponding image is clarified, thereby a warning image is generated. Further, the corresponding thin line may be extracted so as to be clarified, and image conversion may be carried out so as to print out the extracted thin line image separately.

When image conversion is completed, in step 110, print setting is carried out such that an image corresponding to the converted contents is printed out.

In this way, for example, even if an image is printed out from the printer 14 as an image at which blurring or disappearance does not occur, it can be clarified that there is the possibility that blurring or disappearance may occur on a printed matter obtained by using a printing plate. Further, by clarifying such an image, appropriate proofing can be carried out.

Generally, in printing by using a printing plate, a resolution of about 1200 dpi to 3600 dpi can be obtained. However, in the printer 14 such as a color laser printer, a page printer, or the like, the resolution is about 400 dpi to 600 dpi. Further, in a printout from the printer 14, an image which is finer than the resolution of the printer 14 is converted to an image in accordance with the resolution of the printer 14.

Accordingly, a line image, at which blurring or disappearance may occur in a printed matter prepared by using a printing plate, is not printed on a printed matter prepared by the printer 14 with the same appropriateness as the printed matter prepared by using the printing plate.

On the other hand, the thin line warning function extracts line images at which there is the possibility that blurring or disappearance may occur on a printed matter obtained by using a printing plate, and issues a warning. Appropriate proofing is thereby possible.

Here, a concrete example of the thin line warning will be described. In the image processing device 32, as the thin line warning function, when a line image of a predetermined thickness or less is extracted, a warning message expressing that a thin line has been extracted is displayed on an unillustrated monitor of the client terminal 16. Further, when image processing for the extracted thin line is set, by carrying out image processing based on the setting, the corresponding image is clarified on a printed matter (proof) outputted from the printer 14.

Such a thin line warning function is set by, for example, the dialogs shown in FIG. 3A and FIG. 3B, or the like, when a print job is outputted from the client terminal 16.

In the image processing device 32, as the processing for a thin line, any of "erasing" of the extracted thin line, "extracting" for separately printing out only the extracted thin line as a warning page, "erasing+extracting" for erasing the thin line from the proof and separately printing out the extracted thin line, and "warning" for converting the extracted thin line so as to have a warning color or so as to be a thick line, can be selected. Further, when "warning" is selected, the thickness of the line at the time of converting the thin line to a thick line or the color at the time of converting to a warning color can be set. Therefore, the corresponding thin line is clarified on a printed matter outputted from the printer 14.

Further, in this thin line warning function, a threshold value of the extracted thin line can be set. Note that, a type of warning can be designated by a pull-down menu. By inputting the numeric value of the threshold value, the thickness of the thin line to be extracted can be selected.

Figure 4:
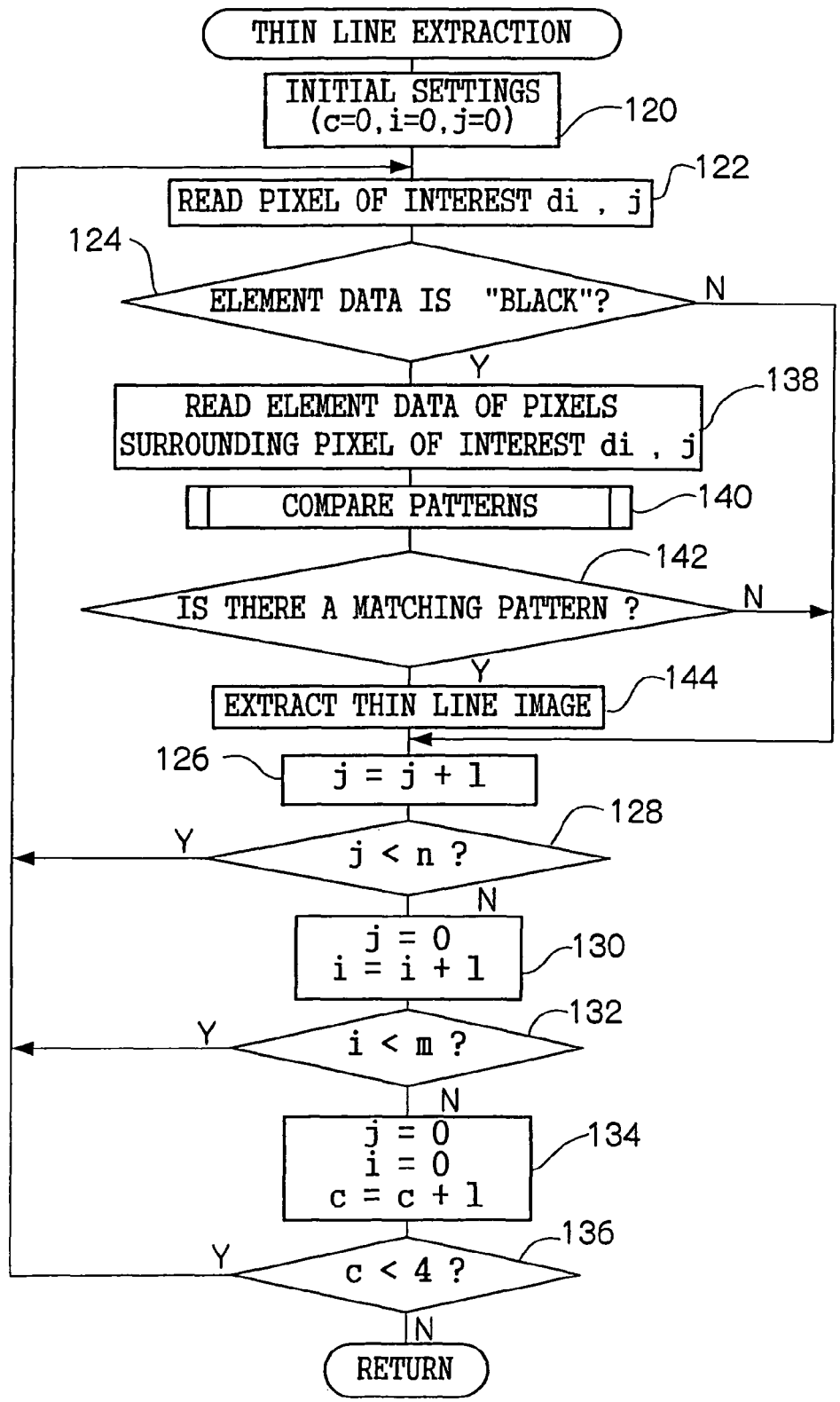
FIG. 4 is a flowchart showing one example of extracting of pixels forming a line image.

In FIG. 4, an overview of extraction of a thin line from the raster data generated in the image processing section 24 and a processing for the extracted thin line are shown. Further, in FIG. 5, an overview of image conversion processing for the extracted thin line when a thin line image is extracted is shown. Note that one example of the extraction of pixels (thin lines) is shown. The pixel extraction is not limited to this, and any conventionally known, arbitrary algorithm can be applied.

When image conversion is carried out in the image processing device 32, the original raster data are stored in an image memory Sc, and raster data based on a designated processing are stored in an image memory Dc. Further, in the case of a color image, extracting of thin lines is carried out with respect to raster data of the four colors of C, M, Y, K (color counter c=0, 1, 2, 3). Note that, hereinafter, description will be given with the element data of the pixels (colored pixels) forming the image being "black", and the element data of pixels (uncolored pixels) which are non-image portions being "white".

Figure 6:
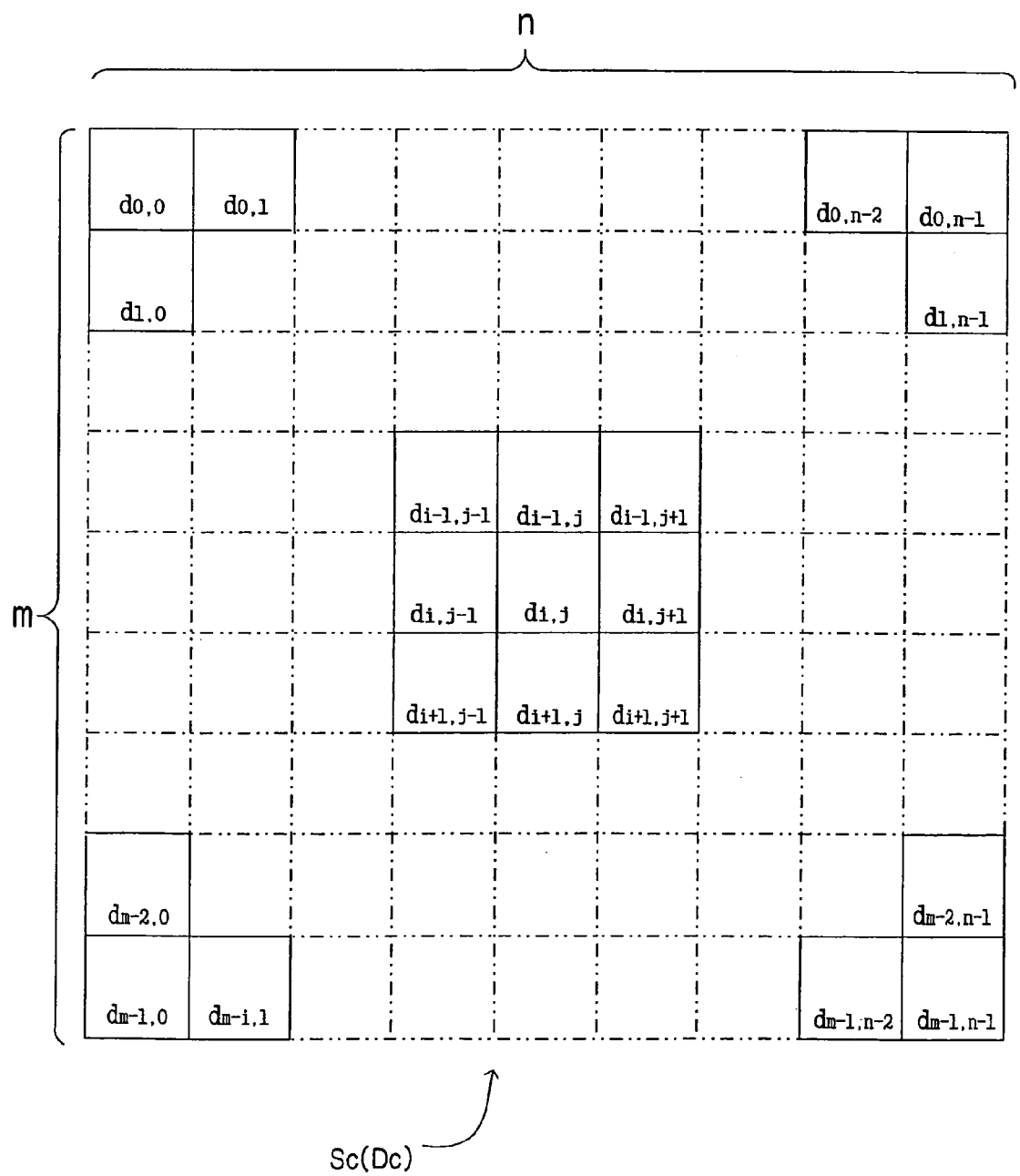
FIG. 6 is a schematic diagram showing raster data.

Here, in extracting the pixels, attention is focused on an arbitrary pixel $d_{i,j}$ (hereinafter referred to as "pixel of interest $d_{i,j}$") in the raster data shown in FIG. 6. It is verified whether the element data of the pixel of interest $d_{i,j}$ is "black" (image portion) or "white" (non-image portion). At this time, when the resolution of a printed matter obtained by using a printing plate is 2400 dpi, extracting of pixels forming the thin line from raster data of 1200 dpi is carried out.

Note that range at which the extracting of pixels is carried out (m×n pixels: $0 \leq i \leq m-1$, $0 \leq j \leq n-1$) may be one page of the proof. Or, one page may be divided into a plurality of regions, and extracting of pixels may be successively carried out in each divisional region. Note that when the raster data of one page is used, the element data of the pixels of a region other than the m×n pixels region (a region corresponding to a margin portion at a peripheral portion of the proof) is "white".

When the element data of the pixel of interest di,j is "black", it is judged whether or not the pixel of interest di,j is a pixel forming a thin line, on the basis of the element data in a region of p×q pixels (for example, the 3×3 pixels shown by the solid lines in FIG. 6) including the pixel of interest di,j.

Figure 7:
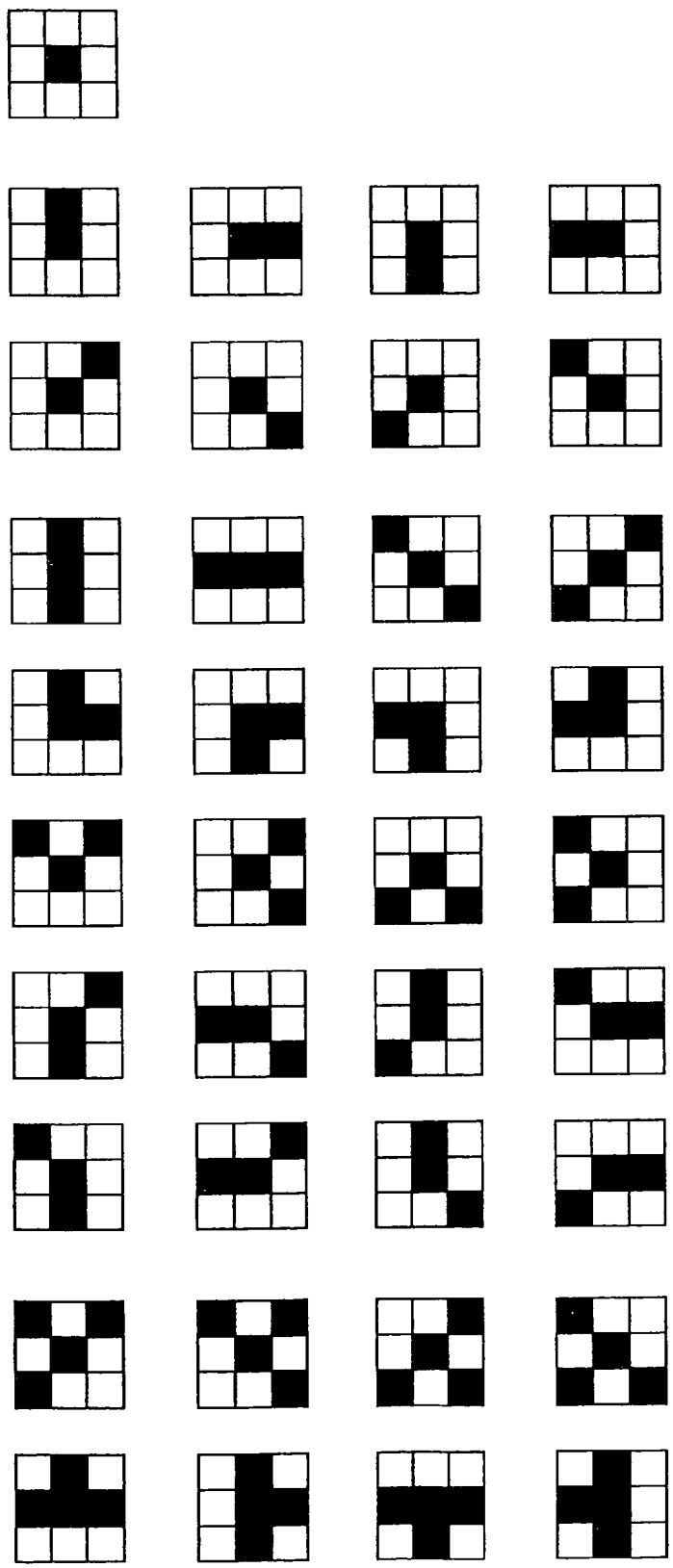
FIG. 7 is a schematic diagram showing examples of mask patterns for carrying out extracting of pixels.

At this time, mask patterns shown in FIG. 7 are stored in the fine line image extracting section 26. It is judged whether or not the pixel of interest di,j is a pixel forming a thin line, on the basis of judging whether or not a predetermined region including the pixel of interest di,j corresponds to any of the mask patterns. Note that, in FIG. 7, mask patterns corresponding to regions of 3×3 pixels are shown as examples.

The flowchart shown in FIG. 4 is executed when the raster data of the respective colors of C, M, Y, K are generated in a state in which the thin line warning function is turned on. In the first step 120, initial setting is carried out. In this initial setting, a row variable i, a column variable j, and a color counter c are reset (i=0, j=0, c=0). Note that, in a case of four colors of C, M, Y, K, the color counter c=0, 1, 2, 3.

Thereafter, in step 102, element data of the pixel of interest di,j specified by the row variable i and the column variable j is read, and in step 124, it is judged whether or not the element data is "black". At this time, when the element data of the pixel of interest di,j is "white" and is a pixel of the non-image portion, the determination in step 124 is negative. The routine proceeds to step 126, where the column variable j is incremented. In step 128, it is judged whether or not the column variable j has reached a predetermined value n.

In this way, if judgements with respect to the pixels of interest di,j of one row are not completed, the judgement in step 128 is affirmative. The routine proceeds to step 122 where a judgement with respect to the next pixel of interest di,j is carried out. Further, when the judgements with respect to the pixels of interest di,j of one row have been completed, the judgement in step 128 is negative, and the routine proceeds to step 130.

In this step 130, the column variable j is reset (j=0), and the row variable i is incremented (i=i+1). In step 132, it is judged whether or not the row variable i has reached a predetermined value. If the judgements with respect to the pixels of interest of one row have not been completed, the judgement in step 132 is affirmative, and the routine proceeds to step 122. Further, if the judgements with respect to the pixel of interest di,j of one row have been completed, the judgement in step 132 is negative, and the routine proceeds to step 134.

In step 134, the row variable i and the column variable j are reset, and the color counter c is incremented. In step 136, it is judged whether or not the color counter c is less than a predetermined value. If the color counter c is less than a predetermined value, it is judged that judgements with respect to the raster data of all of the colors have not be completed (an affirmative judgement in step 136), and the routine proceeds to step 122. Further, when judgements with respect to the raster data of the respective colors of C, M, Y, K are completed, the judgement in step 136 is negative, and the extracting processing of the thin image is completed.

On the other hand, when the element data of the pixel of interest di,j is "black", the judgement in step 124 is affirmative, and the routine proceeds to step 138. In this step 138, element data of the pixels (in the present embodiment, 3×3 pixels as an example) in a predetermined region, of which the pixel of interest di,j is located in the center, are read. Thereafter, in step 140, a pattern formed by the pixels in the predetermined region and the mask patterns set in advance are compared. In step 142, it is verified whether or not there is a coincident pattern. If there is no coincident pattern, the judgement in step 142 is negative, and the routine proceeds to step 126.

On the other hand, when there is the coincident pattern, the judgement in step 142 is affirmative, and the routine proceeds to step 144, where it is set that the pixel of interest di,j is a pixel forming a thin line.

In the image processing device 24, a warning expressing that a thin line has been extracted is issued on the basis of the result of setting, and a processing for the extracted pixel is carried out.

Figure 5A:
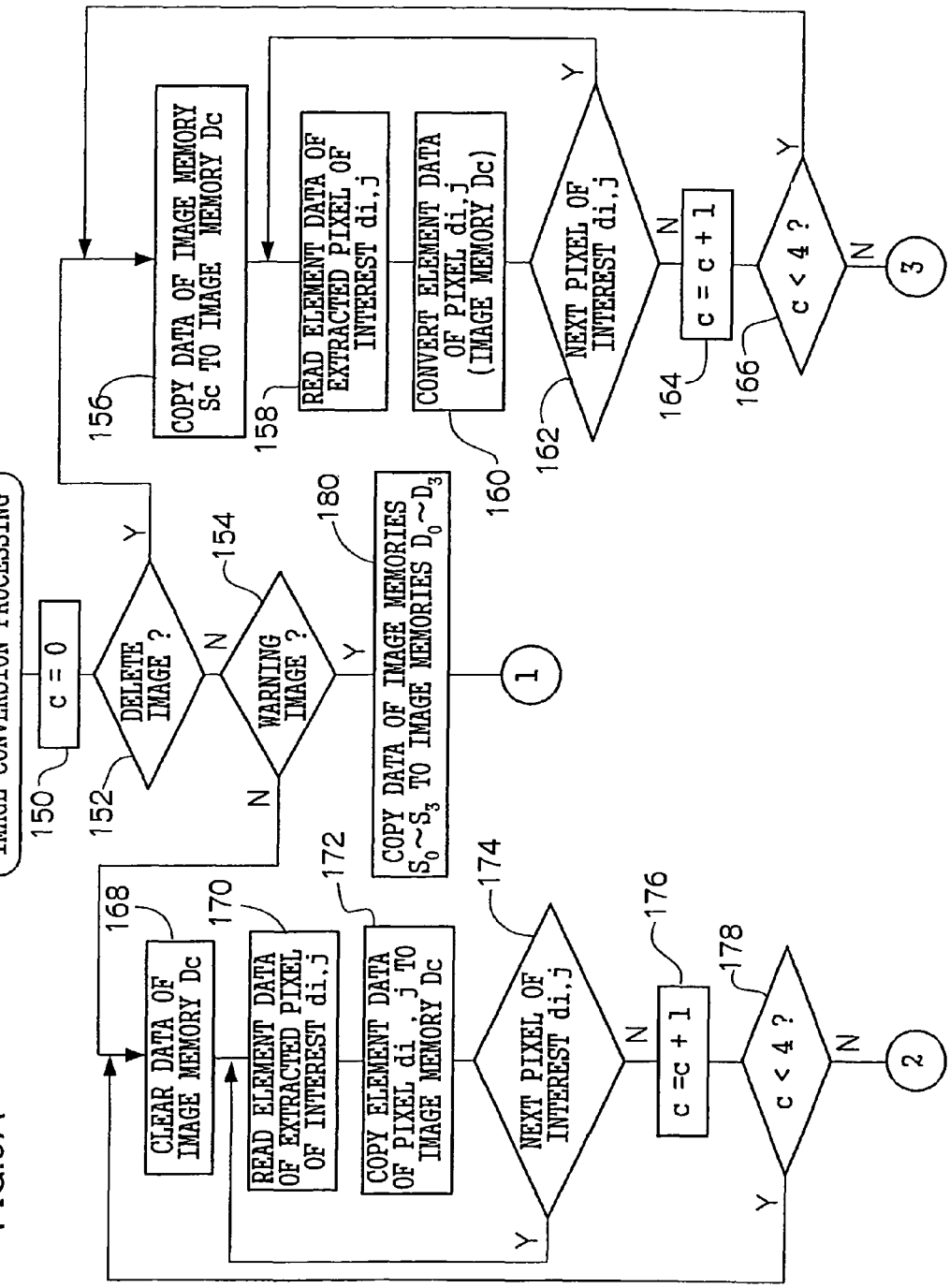
FIGS. 5A and 5B are flowcharts showing one example of image conversion.
Figure 5:
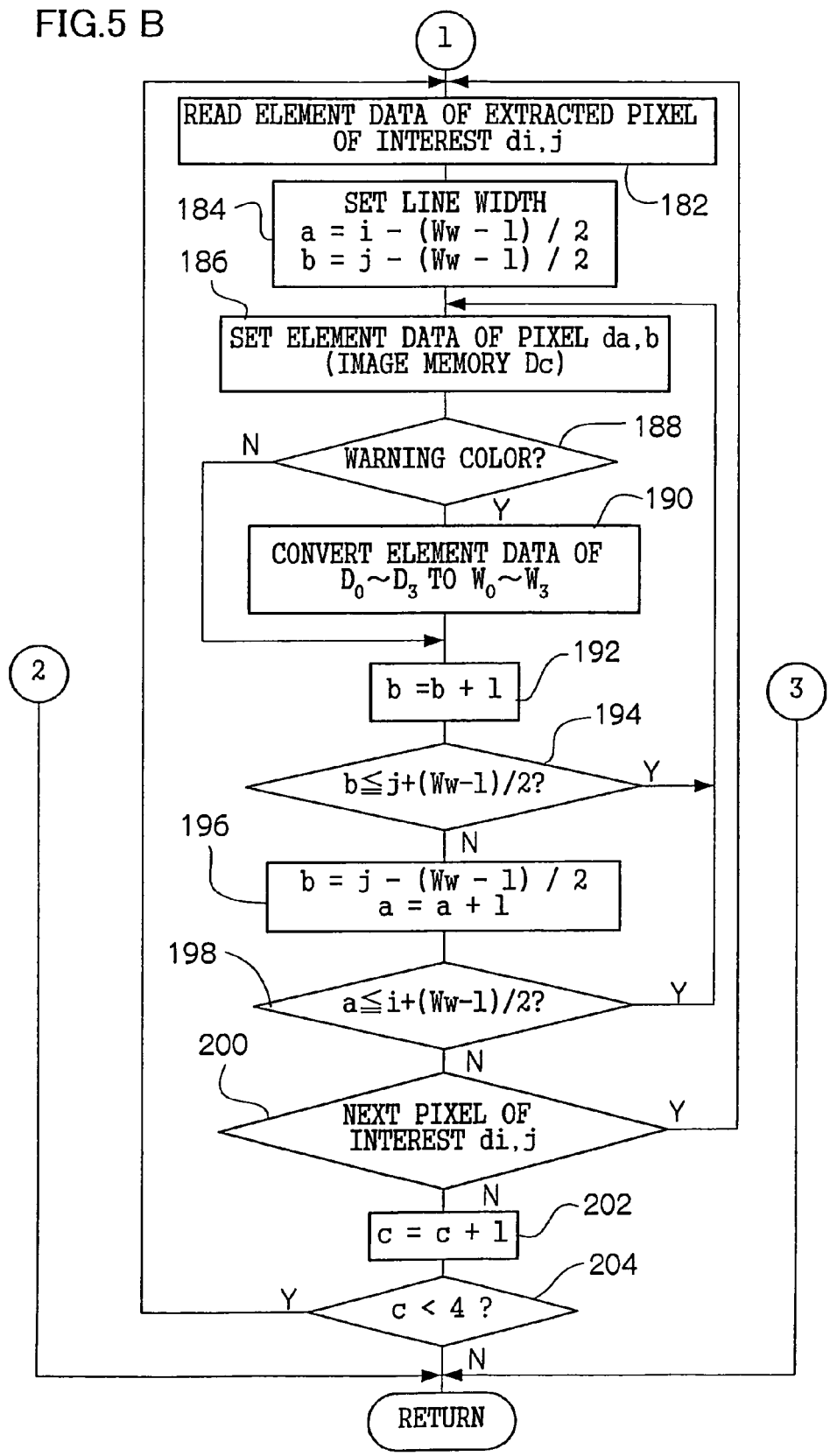

In FIG. 5, one example of a conversion processing on an image formed by extracted pixels is shown. Note that, in the image conversion processing which will be described hereinafter, a thickness of line at the time of converting a thin line to a thick line is represented as a number of pixels Ww, and the respective color components of colors to be converted (components of the respective colors of C, M, Y, K) are represented as Wc (c=0 to 3).

Due to the color counter c being reset in the first step 150, this flowchart is set for the raster data of the first color image. Thereafter, in step 152, it is verified whether the designated processing is erasing of the extracted image, and in next step 154, it is verified whether the designated processing is converting to a warning image.

Here, when the designated processing is set to erasing of the extracted image, the judgement in step 152 is affirmative, and the routine proceeds to step 156. In this step 156, data of the image memory Sc is copied to the image memory Dc, and in step 158, the extracted pixel of interest di,j is read. Thereafter, in step 160, the element data of the pixel of interest di,j is converted from "black" to "white", and the result of conversion is stored in the image memory Dc, as the element data of the corresponding pixel di,j.

Thereafter, in step 162, it is verified whether or not there is a next pixel of interest (extracted pixel) di,j. When there is the next extracted pixel of interest di,j, the judgement in step 162 is affirmative. The routine proceeds to step 158, where a processing with respect to the next pixel of interest di,j is carried out.

In this way, when an image processing on the raster data of one color is completed and the judgement in step 162 is negative, the routine proceeds to step 164. After the color counter c is incremented, it is verified whether the value of the color counter c is less than a predetermined value (step 166).

In this way, by converting the element data of the pixels of interest di,j extracted for the respective colors of C, M, Y, K, image data in which a line image formed by the extracted pixels of interest di,j are eliminated can be obtained.

On the other hand, as a conversion processing, when a designation is given to obtain a printed matter (a warning page) in which a line image formed by the pixel of interest di,j is extracted, the judgements in steps 152, 154, are negative and the routine proceeds to step 168. In this step 168, data of the image memory Dc, in which the converted image is stored, is cleared. In this way, setting is carried out so as to obtain a printed matter which is a white (blank) sheet.

Thereafter, in step 170, the element data of the extracted pixel of interest di,j is read, and the element data of the pixel of interest di,j is stored as the element data of the corresponding pixel di,j in the image memory Dc (step 172).

Further, in step 174, it is verified whether there are remaining pixels of interest di,j. When there are pixels of interest di,j, the judgement is affirmative, and the routine proceeds to step 170. Moreover, in step 176, due to the color counter c being incremented, the next color is set. In step 178, it is verified whether image conversion with respect to all of the colors has been completed.

Due to image conversion being carried out in this way, raster data, which can output a printed matter at which only thin lines are extracted, is generated at the image memory Dc.

When conversion to a warning image (not image processing or image extraction mentioned above) is designated, after the judgement in step 152 is negative, the judgement in step 154 is affirmative. The routine proceeds to step 180, and data of the image memory Sc (image memories $S_0, S_1, S_2, S_3$) are copied to the image memory Dc (image memories $D_0, D_1, D_2, D_3$).

Thereafter, in step 182, the extracted pixel of interest di,j is read, and a line width Ww is set in step 184. Note that, when there is no designation of the line width Ww and no conversion to a thick line, the line width Ww=1, therefore a=I and b=j.

In next step 186, the element data of a pixel da,b is set to "black", and the data is copied to the corresponding pixel in the image memory Dc.

Further, in step 188, it is judged whether conversion to a warning color, which is color conversion of an extracted thin line, has been designated or not. When a conversion to a warning color has been designated, the judgement in step 188 is affirmative, and the routine proceeds to step 190. In this step 190, the data of the pixel da,b is converted to data corresponding to a designated warning color Wc (warning colors $W_0, W_1, W_2, W_3$), and is copied to the image memory Dc (image memories $D_0, D_1, D_2, D_3$).

Thereafter, in step 192, a column variable b is incremented (b=b+1), and in step 194, it is verified whether a width in a direction of the column is within the set line width Ww. Further, in step 196, the column variable b is reset to its initial value (the value set in step 184), and a row variable a is incremented (a=a+1). In step 198, it is verified whether a width in a direction of the row is within the set line width Ww.

In this way, conversion processing with respect to the pixels around the extracted pixel of interest di,j is carried out until a line image having a predetermined width is formed (during the time, the judgement in step 194 or step 198 is affirmative), with the extracted pixel of interest di,j being center.

Further, in step 200, it is verified whether there is a next pixel of interest di,j. When conversion processing with respect to the pixels of interest di,j is completed and the judgement in step 200 is negative, the routine proceeds to step 202. After the color counter c is incremented, it is verified whether the color counter c is less than a predetermined value. If the color counter c has not reached the predetermined value, the routine proceeds to step 182, and processing for the next color is carried out.

Due to image conversion being carried out in this way, a printed matter in which extracted thin lines are converted to warning color, a printed matter in which extracted thin lines are converted to thick lines, or a printed matter in which extracted thin lines are converted to thick lines and to warning color as well, can be obtained. By the printed matter, an image, at which there is the possibility that blurring or disappearance will occur at the time of printing processing using a printing plate, is clarified.

Accordingly, by a proof outputted from the printer 14, appropriate proofing for image data can be carried out.

Note that description was given above of a case in which processing, with respect to an image extracted on the basis of the thin line warning function, is set in advance in a drawing command. However, the thin line warning function may be set in advance in the print server 12. Namely, regardless of the presence/absence of setting of the thin line warning function in a drawing command, the print server 12 may carry out on/off setting of the thin line warning function and a designation of a conversion image, from the application which generated the image data or the drawing command, or from the client terminal 16.

Further, in the present embodiment, although it is described that conversion processing of an image is designated, it suffices to set at least the on/off of the thin line warning function. In this case, when a predetermined thin line is extracted by the thin line warning function and a warning is given to the client terminal 16, input of designation for the conversion processing may be required.

Figure 8:
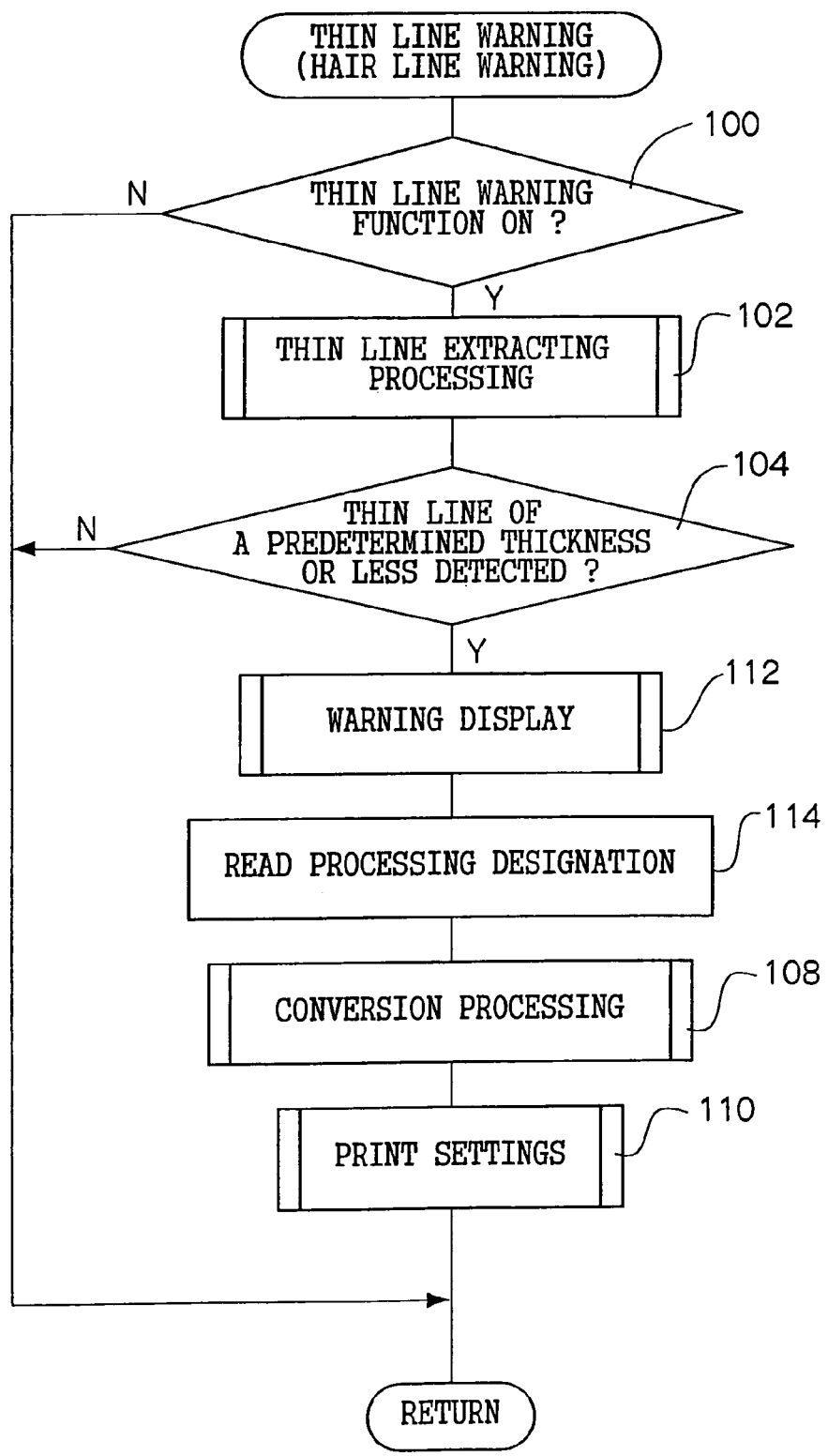
FIG. 8 is a flowchart showing another example of processing applied to the invention, and is a flowchart showing one example carrying out prevention of image erasing and blurring.

Namely, as shown in the flowchart of FIG. 8, pixel extracting is carried out, and warning is given for a thin line whose thickness is less than or equal to a predetermined value (step 112). At this time, a menu for selecting the conversion processing is also displayed on the monitor of the client terminal 16. When a designation of the conversion processing is inputted from the client terminal 16, the routine proceeds to step 114, and the designation of the conversion processing is read. Thereafter, in step 108, conversion processing based on the designation is carried out.

Further, a preview screen, at which the extracted line image is clarified, may be displayed at the client terminal 16. In this case, interruption of the printing processing can be designated from the client terminal 16.

Note that the above-described present embodiment does not limit the structure of the invention. For example, in the present embodiment, an example of preparing a proof was described. However, the present invention is not limited to the same. Any arbitrary structure can be used provided that, when it is judged, for any of drawing commands from the client terminal 16, that there is the possibility that blurring or the like will occur in a printed-out image, conversion processing with respect to the corresponding image is carried out and a warning is given to clarify the converted contents.

Further, in the present embodiment, description is given of a case in which the image processing device of the invention is applied to the print server 12. However, the invention is not limited to the same. The image processing device of the invention may be provided, for example, at an intermediate server disposed between a plurality of client terminals 16 and a print server or a printer, as an image processing device which carries out processing on the basis of image data inputted from the client terminals. Or, the image processing device of the invention may be provided on a network together with the client terminals 16, and may be used as an image processing device carrying out a predetermined processing with respect to image data inputted from the client terminals.

In accordance with the above-described invention, when an image, such as a line image or the like, at which there is the possibility that blurring or disappearance will occur, for example, on a printed matter printed out by preparing a printing plate, is extracted, a warning is given such that this image is clarified. Further, due to image conversion being carried out such that this image is clarified, an excellent effect is achieved in that accurate proofing is possible even when proof printing or the like is carried out.

What is claimed is:

1. An image processing device, comprising:
    a user interface including first and second display regions,
        the first display region configured to receive from a user a first numerical value corresponding to a first line width at which a finishing image output device will output an image that disappears or becomes blurred at the first line width, the second display region configured to receive from the user a second numerical value corresponding to a second line width, which is thicker than the first line width;

an extracting section that extracts a first line image having the first line width or less from a page layout generated by an application program in reference to the first line width specified by the first display region; and an image converting section that converts the first line image extracted by the extracting section to a second line image having the second line width, the second line width being output to an image proof forming device to provide an image proof of the page layout prior to outputting to the finishing image output device, the second line image being at the second line width in the image proof.

2. The image processing device according to claim 1, wherein the first and second display regions are displayed concurrently so as to allow a user to input the first and second numerical values corresponding to the first and second line widths on a same dialog box.

3. The image processing device according to claim 1, wherein the finishing image output device prints out printed matter with a printing plate.

4. An image processing method, comprising:

displaying first and second display regions, the first display region configured to receive from a user a first numerical value corresponding to a first line width at which a finishing image output device will output an image that disappears or becomes blurred at the first line width, the second display region configured to receive from the user a second numerical value corresponding to a second line width which is thicker than the first line width;

extracting a first line image having the first line width or less from a page layout generated by an application program in reference to the first line width specified by the first display region;

converting the extracted first line image to a second line image having the second line width; and outputting the second line width to an image proof forming device to provide an image proof of the page layout prior to outputting to the finishing image output device, the second line image being at the second line width in the image proof.

5. The image processing method according to claim 4, wherein the first and second display regions are displayed concurrently so as to allow a user to input the first and second numerical values corresponding to the first and second line widths on a same dialog box.

6. The image processing method according to claim 4, wherein the finishing image output device prints out printed matter with a printing plate.

7. A computer readable medium storing a program causing a computer to execute a process for image processing, the process comprising:

displaying first and second display regions, the first display region configured to receive from a user a first numerical value corresponding to a first line width at which a finishing image output device will output an image that disappears or becomes blurred at the first line width, the second display region configured to receive from the user a second numerical value corresponding to a second line width which is thicker than the first line width;

extracting a first line image having the first line width or less from a page layout generated by an application program in reference to the first line width specified by the first display region;

converting the extracted first line image to a second line image having the second line width; and outputting the second line width to an image proof forming device to provide an image proof of the page layout prior to outputting to the finishing image output device, the second line image being at the second line width in the image proof.

* * * * *